May 18, 1965  G. A. ALBERS ET AL  3,184,578
METAL TRANSFERRING PROCESS AND APPARATUS
Filed April 13, 1962
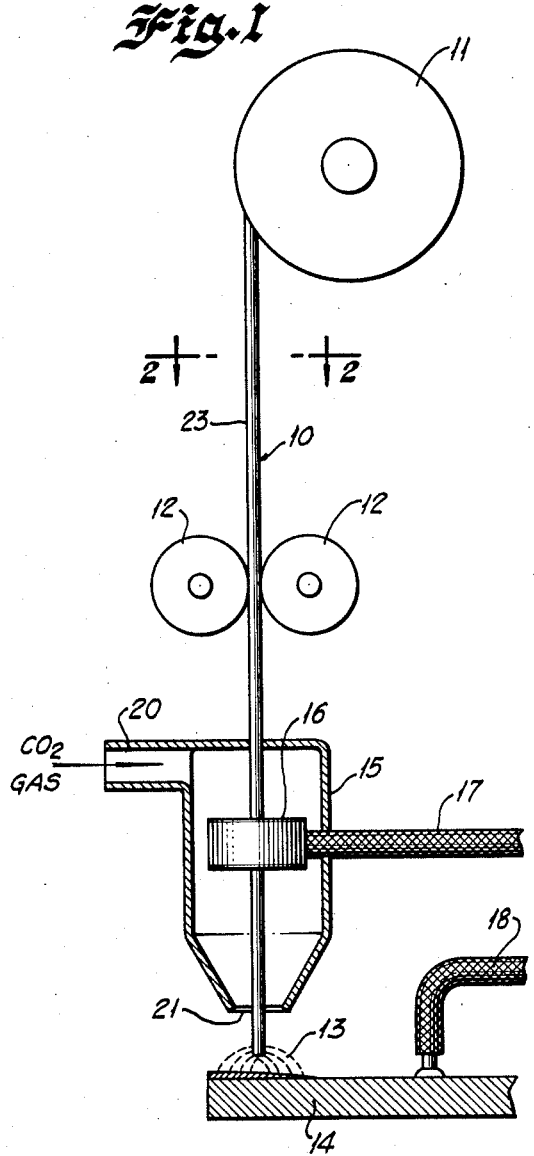
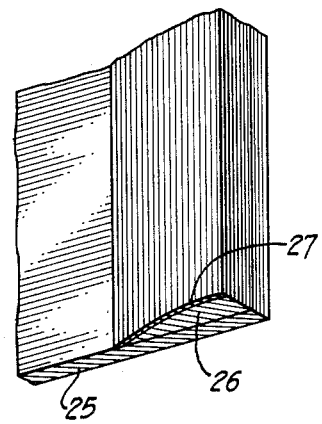
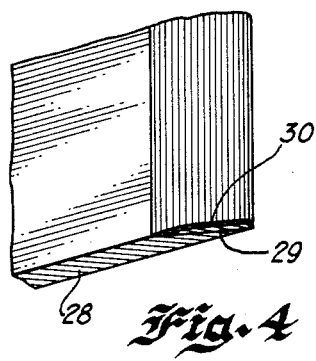
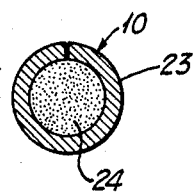
INVENTORS
GUS A. ALBERS AND
BY WILLIAM G. SCHUMACHER
Mason, Kolehmainen, Rathburn and Wyss.
ATTORNEYS.

United States Patent Office 3,184,578
Patented May 18, 1965

3,184,578
METAL TRANSFERRING PROCESS AND APPARATUS
Gus A. Albers, Houston, Tex., and William G. Schumacher, Hoffman Estates, Ill., assignors to Chemetron Corporation, Chicago, Ill., a corporation of Delaware
Filed Apr. 13, 1962, Ser. No. 187,429
5 Claims. (Cl. 219—146)

The present invention relates to a method and apparatus for transferring metal, and more generally to a new and improved method and apparatus for using an electric arc as a means for transferring metal from a welding electrode or the like to a base metal.

It has been common practice for some time in welding and hard surfacing processes to use an electrode having the desired constituents to perform the desired metal transfer operation. In copending Bernard et al. application Serial No. 496,260, filed March 23, 1955, now Patent No. 3,051,822, and assigned to the same assignee as the instant application, there is disclosed an electric arc welding process employing a hollow electrode having the external appearance of a bare wire, the arc being shielded by a carbon dioxide gas. In this process the electrode contains slag-forming materials so that the trailing weld pool is shielded by slag. The process and apparatus of the above-mentioned application has proven to be very successful as a welding process for joining two metals together or the like. There are, however, applications involving metal transfer, such, for example, as the hard surfacing of metal objects for which the process and apparatus of the prior art is adaptable. There are many applications where it is desired to have abrasion resistant materials. This is particularly true in connection with earth moving equipment, scraping equipment, graders, mining equipment, plows, shovels, earth boring equipment, etc., where it is essential to have the portions of the apparatus subject to severe abrasions coated with a hard surface material. A hard surface material is one that generally may be said to have a hardness in excess of 40 Rockwell "C." Many metal transfer processes can be employed if all that is essential is to transfer metal and the question of abrasion and impact strength is not important. The real problem arises when an abrasion resistant surface is desired which is also resistant to high impacts. In earth moving and mining equipment and drilling bits, tool joints, oil field equipment, and earth boring apparatus and the like, it is obvious that not only must abrasion resistant material be provided, but this material must have high impact strength. It would be desirable to provide a method and apparatus for applying a hard surfacing coating to parts of equipment and apparatus which is subject not only to abrasion but also to impact, and to apply this coating by an electric arc in a manner which will insure that the coating has both great abrasion resistance and impact strength.

Heretofore it was necessary to preheat the metal which was to be hard surfaced, since otherwise, without preheating, metal transfer to such surface would cause cracking and fissuring of the surface due to the rapid cooling thereof. Any cracking and fissuring of the surfacing material is completely unsatisfactory, since it is obvious that it would weaken it and greatly reduce its impact strength. It would be desirable to provide a hard surfacing process and apparatus which would result in a hard surface completely free of cracks, and wherein it is unnecessary to preheat the material. It will also be appreciated that where preheating is necessary the equipment that could be hard surfaced is of necessity limited to small pieces that could conveniently be preheated to the necessary 600° to 800° F. Obviously, as a practical matter, one could not preheat large equipment such as the pushing blade of a "bulldozer," large shovels, and the like. Preheating such items was much too costly and handling this equipment in a preheating operation would also be clumsy and time consuming.

Accordingly, it is an object of the present invention to provide a new and improved metal transfer process and apparatus particularly adapted for hard surfacing wherein the ultimate product was resistant to abrasion and moreover had a high impact strength.

It is another object of the present invention to provide a process of hard surfacing wherein a crack-free surface having high impact strength can be produced without preheating the material to be hard surfaced.

Still another object of the present invention is to provide an improved electrode for use in the hard surfacing process which will insure slow chilling of the hard surfacing material and prevent too rapid contact with the atmosphere.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawing in which:

FIG. 1 is a schematic diagram partly in section of a metal transfer process for carrying out the process of the present invention;

FIG. 2 is a greatly enlarged sectional view of an electrode employed in the process of the present invention taken on line 2—2 of FIG. 1;

FIG. 3 is a greatly enlarged perspective view showing a cross section of a piece of equipment to which has been applied a hard surface in accordance with the present invention; and FIG. 4 is a perspective view similar to FIG. 3 illustrating another piece of equipment to which a hard surface has been applied by the process of the present invention; and FIG. 5 is an enlarged sectional view of another electrode configuration employed in the process of the present invention.

Briefly, the present invention is concerned with a hard surfacing process employing an electric arc and a continuous electrode containing a mixture of hard surfacing materials, such as tungsten carbide, boron carbide, etc., and slag-forming and arc-stabilizing materials which are transferred to the surface to be coated through the arc. Moreover, the arc is shielded by a curtain of carbon dioxide gas or, if desired, one of the monatomic gases. A thin walled electrode is employed which is, in effect, a hollow conductive tube and within this tube is a granular material comprising sixty-five to ninety percent of the hard surfacing material within the hollow tube, such as tungsten carbide, boron carbide, other metal carbides or the like, and ten to thirty-five percent of the flux comprising slag-forming materials, arc-stabilizing materials, etc., preferably of the prefused type. The tube material may range in thickness from 0.010 inch to 0.020 inch more or less, and the mixture of hard surfacing material and flux comprises from about twenty-five percent to about seventy-five percent by weight of the conductive tubing, if the latter is steel for example. This weight range will obviously be extended to as low as five percent if correspondingly lighter, less dense conductive tube materials are employed, such as conductive organic polymers for example.

Referring now to the drawing, and particularly to FIG. 1 thereof, there is illustrated an electrode 10 which is effectively a continuous electrode having the external appearance of a bare electrode and which is supplied from a suitable reel 11 and fed between feed rollers 12 to maintain an arc designated at 13 between the lower end of this electrode and a surface or work piece 14 to which metal is to be transferred. The electrode 10 is fed through what might be termed a welding head 15 including a contactor 16 or other suitable means in electrical contact with the exterior of the electrode 10. Suitable electrical energy is supplied to the contactor 16 and the work piece 14 as by cables 17 and 18 to cause the desired current to flow through the lower portion of the electrode 10, and particularly through the arc 13. A suitable transparent shielding gas or medium, preferably carbon dioxide, but which might also comprise an inert monatomic gas, such as argon, is supplied to the welding head 15 through the gas supply opening 20 from a separate source, not shown. This gas flows around the contactor 16 and is discharged through a discharge opening 21 around the lower end portion of the electrode 10 and against the work 14, thus providing a shielding curtain around the lower end of the electrode 10 and the arc 13. The particular apparatus described thus far is conventional apparatus employed in many welding processes and the present invention is concerned with using an improved electrode for hard surfacing the work piece 14. The work piece 14 may comprise a portion of a tool subject to abrasion and impact, and the operator relatively moves the welding head or gun 15 back and forth with respect to the material as the hard surface is applied thereto by the metal transfer process of the present invention.

In accordance with the present invention, the electrode 10 comprises a supporting member in the form of an outer tubular sheath 23 (FIG. 2) which preferably is formed from flat strip and converted to the butt joint tubular configuration in a manner disclosed in the above-mentioned copending Bernard et al. application, or with a tube 23a having a shoulder lap joint 23b (FIG. 5). The tube 23 or 23a performs two functions. It provides a current carrier so that current for sustaining the arc 13 is provided and, secondly, it holds together a mixture 24 of hard surfacing, slag-forming materials, etc., of the present invention which is uniformly associated with the supporting member 23 or 23a along the length thereof. Obviously, if a steel tube, it also provides some steel which is added to the mixture of slag-forming materials and hard surfacing materials. In an embodiment built in accordance with the present invention, the tube 23 or 23a had a wall thickness of between fifteen- and nineteen-thousandths of an inch and comprised fifty-eight percent by weight of the total electrode, the other forty-two percent by weight comprising the mixture 24 including the hard surfacing, slag-forming and other fluxing materials. Also, in a specific embodiment constructed in accordance with the present invention, the granular material 24 contained within the tube or sheath 23 or 23a comprised eighty percent of hard surfacing material in the form of tungsten carbide granules and twenty percent of granular fluxing material comprising principally prefused slag-forming materials. The conductive tube material in this instance was mild steel of about 0.020 inch thickness and comprised fifty-five percent to about sixty percent of the total electrode by weight.

It should be appreciated that the hard surfacing material, instead of comprising tungsten carbide granules, might comprise any other hard surfacing material such as compounds of boron, vanadium, etc., which have a hardness in excess of 8 Mohs, which are capable of producing hard surfacing coating which will have a hardness in excess of 40 Rockwell "C." The mixture 24 contained within the hollow electrode 23 should comprise between sixty-five and ninety percent tungsten carbide in granular form or other similar hard surfacing materials, and ten to thirty-five percent of flux comprising principally prefused slag-forming materials. If the percentage of tungsten carbide particles is reduced below sixty-five percent of the mixture of hard surfacing material and flux, then the hardness of the hard surface coating deposited will not be hard enough to have the desired abrasion resistance, and if the percentage of prefused slag-forming materials and the like is less than ten percent of that mixture, insufficient slag coating is formed which might result in cracking and thus reduce the impact strength of the hard surface coating. It has been found that the between ten and thirty-five percent of the mixture 24 which comprises the slag-forming and arc-stabilizing portion incorporated with the granules of hard surface material can comprise the following:

| | Percent |
|---|---|
| Rutile | 15 to 35 |
| Ferromanganese | 13 to 32 |
| Ferrosilicon | 13 to 32 |
| Fused flux material | 20 to 40 | which fused flux material can comprise the following:

| | Percent |
|---|---|
| Sodium carbonate | 20 to 40 |
| Silica | 0 to 20 |
| Manganese dioxide | 10 to 40 |
| Rutile | 0 to 50 |

In a specific embodiment, the fused flux material comprised:

| | Percent |
|---|---|
| Sodium carbonate | 25.0 |
| Silica | 10.0 |
| Manganese dioxide | 25.0 |
| Rutile | 40.0 |

Another example of the mixture 24 found to be satisfactory for a hard surfacing electrode was the following:

| | Percent |
|---|---|
| Tungsten carbide | 80.0 |
| Fused flux material | 6.0 |
| Rutile | 5.0 |
| Ferromanganese | 5.0 |
| Ferrosilicon | 4.0 |

The fused flux material could comprise the above-described additive or either of the following:

(1)

| | Percent |
|---|---|
| Sodium metasilicate | 40.0 |
| Manganese dioxide | 20.0 |
| Titanium dioxide | 40.0 |

(2)

| | Percent |
|---|---|
| Sodium metasilicate | 50.0 |
| Calcium metasilicate | 15.0 |
| Titanium dioxide | 35.0 | which are all prefused together.

In carrying out the metal transfer process of the present invention, the material to be hard surfaced, such as the scraper blade 25 shown in FIG. 4 of the drawing, is provided with a hard surface coating 26 and this coating is covered with a thin layer of slag, designated as 27, which is readily removable. This hard surfacing material 26, when produced in accordance with the present invention, is free of cracks or fissures and has very high abrasion resistance as well as great impact strength. In FIG. 4 of the drawing there is illustrated a metal member 28 having a tapered cutting edge to which is applied a hard surface coating 29 in accordance with the process of the present invention. The thin slag coating 30, which is formed during the hard surfacing operation, is illustrated in FIG. 4 and it is obviously readily removable. It will be understood that with the process of the present invention it is unnecessary to preheat the materials, such as 14, 25 and 28, which are to be hard surfaced and, consequently, the process is applicable to very large members, such as the blades of bulldozers and the like. The slag coating, such as 27 and 30, slows the chilling of the hard surfacing material and prevents quick atmosphere contact. Actually, the slag coatings, upon cooling, crack and pop off and, obviously, with use the abrasive action readily removes the same. The metal transfer, in accordance with the present invention, is very smooth and the ingredients included in the mixture 24 within the hollow electrode insure a smooth metal transfer resulting in a very satisfactory hard surfacing. It should be understood that the electrode 10 does not need to be a hollow electrode with the material on the interior thereof, but may be any form which will hold the flux and hard surfacing granules and which will simultaneously permit the application of the necessary current thereto to sustain the arc.

While there has been described an improved process of transferring metal and an improved composite electrode for use in such process, it should be understood that various changes and modifications thereof will occur to those skilled in the art, and it is intended in the appended claims to cover all of those changes and modifications which fall within the true spirit and scope of the present invention.

What is claimed as new and desired to be secured by Letters Patent of the United States is:

1. A composite electrode for use in an electric arc metal transfer process comprising a tubular supporting member having the electrical characteristics of a bare wire and of no greater hardness than ordinary steel having uniformly associated therewith within the bore of said tubular member a granular mixture comprising between sixty-five and ninety percent by weight of a material having a hardness in excess of 8 Mohs and between ten and thirty-five percent by weight of a flux comprising slag-forming and arc-stabilizing materials of which at least about ten percent is said slag-forming material, the weight of said granular mixture being between twenty-five and seventy-five percent of the weight of said supporting member.

2. The electrode of claim 1 wherein said material having a hardness in excess of 8 Mohs comprises tungsten carbide and said flux comprises prefused slag-forming materials.

3. The electrode of claim 1 wherein said material having a hardness of 8 Mohs comprises boron carbide.

4. The electrode of claim 1 wherein said granular mixture comprises about eighty percent of tungsten carbide, and about twenty percent of a prefused mixture of alkali metal salts, rutile, ferromanganese and ferrosilicon.

5. The electrode of claim 4 wherein said flux includes a prefused mixture of alkali metal salts comprising about 6 percent by weight of the total amount of granular mixture, rutile comprising about 5 percent by weight of the total amount of said granular mixture, ferromanganese comprising about 5 percent by weight of the total amount of said granular mixture and ferrosilicon comprising about 4 percent by weight of the total amount of said granular mixture.

References Cited by the Examiner

UNITED STATES PATENTS

| | | | |
|---|---|---|---|
| 1,825,829 | 10/31 | Stoody et al. | 219—145 |
| 2,700,091 | 1/55 | Culbertson et al. | 219—146 |
| 2,944,142 | 7/60 | Sjoman | 219—146 |
| 3,016,452 | 1/62 | Wilcox | 219—146 |
| 3,023,130 | 2/62 | Wasserman et al. | 117—205 |
| 3,051,822 | 8/62 | Bernard et al. | 219—74 |

FOREIGN PATENTS 807,645   1/59   Great Britain.

RICHARD M. WOOD, *Primary Examiner.*